United States Patent [19]
Winchip

[11] Patent Number: 5,996,769
[45] Date of Patent: Dec. 7, 1999

[54] CONVEYOR SYSTEM

[75] Inventor: Louis L. Winchip, Cedar Rapids, Iowa

[73] Assignee: Svedala Industries, Inc., Waukesha, Wis.

[21] Appl. No.: 09/153,436

[22] Filed: Sep. 15, 1998

[51] Int. Cl.[6] ................................................. B65G 15/16
[52] U.S. Cl. ...................................... 198/626.4; 198/607
[58] Field of Search .................................. 198/604, 606, 198/607, 626.1, 626.2, 626.3, 626.4, 626.5, 626.6

[56] References Cited

U.S. PATENT DOCUMENTS

| | | |
|---|---|---|
| 1,962,713 | 6/1934 | Griffith ..................................... 198/607 |
| 2,254,116 | 8/1941 | Cooper et al. .................... 198/626.4 X |
| 3,605,988 | 9/1971 | McCombie .............................. 198/606 |
| 3,618,746 | 11/1971 | Suloff .................................... 198/626.4 |
| 3,805,946 | 4/1974 | Yateman et al. . |
| 3,848,818 | 11/1974 | Vaillant et al. . |
| 3,983,952 | 10/1976 | Fabian . |
| 4,339,085 | 7/1982 | Williams . |
| 4,383,651 | 5/1983 | Couperus . |
| 4,425,995 | 1/1984 | Blattermann et al. . |
| 4,457,422 | 7/1984 | Hurd . |
| 4,585,118 | 4/1986 | Plaut . |
| 4,585,179 | 4/1986 | Tsuji et al. . |
| 4,598,875 | 7/1986 | Bronson et al. . |
| 4,763,845 | 8/1988 | Guggenheimer et al. . |
| 4,903,903 | 2/1990 | Benen . |
| 4,997,135 | 3/1991 | Zehr . |
| 5,106,490 | 4/1992 | McDonald . |
| 5,161,744 | 11/1992 | Schoop et al. . |
| 5,275,275 | 1/1994 | Boldrini et al. . |
| 5,392,897 | 2/1995 | Akesaka . |
| 5,445,330 | 8/1995 | Shokry Rashwan et al. . |
| 5,460,332 | 10/1995 | Frick . |
| 5,476,227 | 12/1995 | Tamura et al. . |
| 5,566,893 | 10/1996 | Getz . |

FOREIGN PATENT DOCUMENTS

| | | | |
|---|---|---|---|
| 6-80234 | 3/1984 | Japan ................................. | 198/626.1 |
| 0876542 | 10/1981 | U.S.S.R. ............................. | 198/607 |

OTHER PUBLICATIONS

"Conveyors for Tight Spaces"— Nov., 1998, The Concrete Producer, pp. 815–817.
"293Q PaceMaster Gravel Plant" (Exhibit B).
"Universal 293Q PaceMaster" Exhibit (Exhibit A).

*Primary Examiner*—James R. Bidwell
*Attorney, Agent, or Firm*—Foley & Lardner

[57] ABSTRACT

A conveyor system for conveying materials includes an upper conveyor and a lower conveyor. The upper conveyor includes a first pulley, a second pulley spaced from the first pulley and first endless belt extending about the first and second pulleys. The lower conveyor includes a third pulley, a fourth pulley, a fifth pulley and a second endless belt supported about the third, fourth and fifth pulleys. The third, fourth and fifth pulleys support the second endless belt such that the second endless belt at least partially wraps about the second pulley of the upper conveyor against the first endless belt to sandwich materials therebetween and to elevate the materials from the lower conveyor to the upper conveyor.

20 Claims, 3 Drawing Sheets

CONVEYOR SYSTEM

FIELD OF THE INVENTION

The present invention relates to closed circuit crushing plants. In particular, the present invention relates to a conveyor system for elevating materials in a closed circuit crushing plant.

BACKGROUND OF THE INVENTION

Closed circuit portable crushing and screening plants are utilized in quarries or at mining sites to process gravel or stone for commercial use and for crushing and screening other materials such as mineral ore including iron ore and the like. Conventional closed circuit portable crushing and screening plants include an upper conveyor which conveys material to a screening device which screens the material based upon size. The material which has been sufficiently crushed or which has attained the required size passes through the screening device and is discharged from the plant for commercial use or for further processing by another plant. The material which is too large passes from the screening device to a crusher. After being crushed, the material is discharged onto an underlying lower conveyor which conveys the material to an elevating wheel which elevates the material back up onto the upper conveyor for recirculation. The elevating wheel generally consists of a rotating drum with baffles mounted inside the drum. As the drum is turned slowly, the material is lifted and dropped onto the upper conveyor. Although frequently used in portable closed circuit crushing plants to elevate material from the lower conveyor to the upper conveyor, such elevating wheels are extremely expensive to manufacture due to their shape, are expensive to maintain and add energy costs to the system.

Due to the above disadvantages associated with the use of elevating wheels in portable closed circuit crushing plants, other elevating devices have been developed to lift the material from the lower conveyor to the upper conveyor. Couperus, U.S. Pat. No. 4,383,651 and Bronson, U.S. Pat. No. 4,598,875 disclose portable closed circuit crushing and screening plants which utilize an additional intermediate conveyor belt extending between the lower conveyor and the intermediate conveyor belt system having adjacent to elevate crushed materials from the lower conveyor to the upper conveyor. Each of the portable crushing and screening plants disclosed by U.S. Pat. Nos. 4,383,651 and 4,598,875 requires multiple pulleys or rollers to maintain the adjacent belts in sufficient contact with one another to sandwich and lift material between the belts. This intermediate conveyor system also requires an additional motor or other device for driving the adjacent belts. As a result, the intermediate conveyor belt system utilized by the portable crushing and screening plant is space consuming, complex and expensive.

Thus, there is a continuing need for a simple, easily manufactured, compact, lightweight, low-energy consuming, easily maintained and inexpensive elevating device for elevating at least partially crushed gravel, rock or minerals from a lower conveyor to an upper conveyor in a portable closed circuit crushing plant.

SUMMARY OF THE INVENTION

The present invention is directed to a conveyor system for conveying materials. The system includes an upper conveyor and a lower conveyor. The upper conveyor includes a first pulley, a second pulley spaced from the first pulley and a first endless belt extending about the first and second pulleys. The lower conveyor includes a third pulley, a fourth pulley, a fifth pulley and a second endless belt supported about the third and fourth pulleys. The third, fourth and fifth pulleys support the second endless belt such that the second endless belt at least partially wraps about the second pulley of the upper conveyor against the first endless belt to sandwich the materials therebetween and to elevate the materials from the lower conveyor to the upper conveyor.

According to one preferred aspect of the present invention, the first endless belt has a first width and the second endless belt has a second width. The first width is greater than the second width. Preferably, the first width is at least six inches greater than the second width.

According to yet another aspect of the present invention, the conveyor system includes at least one motor coupled to the first and second endless belts. The first and second endless belts are driven at substantially similar speeds. Preferably, the motor is coupled to the first and second endless belts by a drive belt.

According to yet another aspect of the present invention, the second endless belt extends approximately 180 degrees about the second pulley. Portions of the first and second endless belts linearly extend parallel to one another. Preferably, the first conveyor is adapted to move material in a first direction away from the second pulley while the second conveyor is adapted to move material in a second opposite direction towards the second pulley. In addition, the first endless belt preferably has a first portion extending about the second pulley and a second portion extending away from the second pulley while the second endless belt at least partially overlaps both the first and second portions.

The present invention is also directed to a crushing plant including an upper conveyor, a material screening mechanism configured to receive material conveyed by the upper conveyor, a crusher having an inlet for receiving material from the screening mechanism and an outlet and a lower conveyor configured to receive crushed material from the outlet of the crusher. The upper conveyor includes a first pulley, a second pulley spaced from the first pulley and a first endless belt extending about the first and second pulleys. The lower conveyor includes a third pulley, a fourth pulley, a fifth pulley and a second endless belt supported about the third, fourth and fifth pulleys. The third, fourth and fifth pulleys support the second endless belt such that the second endless belt at least partially wraps about the second pulley of the upper conveyor against the first endless belt to sandwich material therebetween and to elevate the materials from the lower conveyor to the upper conveyor.

The present invention is also directed to a portable closed circuit crushing plant which includes a frame, wheels coupled to the frame, an upper conveyor, a material screening mechanism configured to receive material conveyed by the upper conveyor, a crusher having an inlet for receiving material from the screening mechanism, and an outlet and a lower conveyor. The upper conveyor includes a first pulley, a second pulley spaced from the first pulley and a first endless belt extending about the first and second pulleys. The lower conveyor includes a third pulley, a fourth pulley, a fifth pulley and a second endless belt supported about the third, fourth and fifth pulleys. The third, fourth and fifth pulleys support the second endless belt such that the second endless belt at least partially wraps about the second pulley of the upper conveyor against the first endless belt to sandwich materials therebetween and to elevate the materials from the lower conveyor to the upper conveyor.

DETAILED DESCRIPTION OF THE PREFERRED EMBODIMENT

Figure 1:
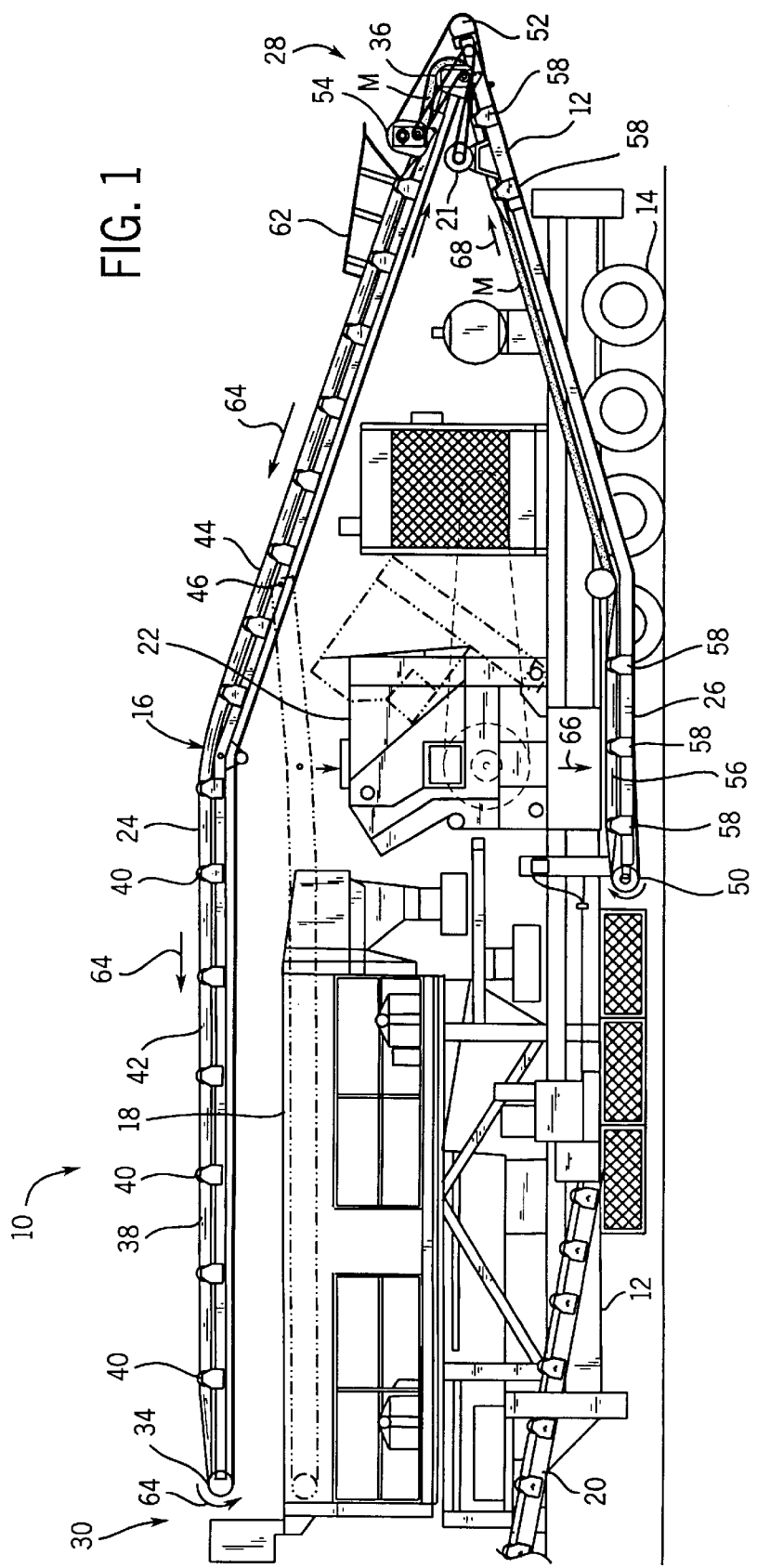
FIG. 1 is a fragmentary side elevational view of a portable closed circuit crushing plant including an exemplary conveyor system of the present invention.

FIG. 1 is a side elevational view of a portable closed circuit crushing plant 10 which generally includes frame 12, wheels 14, recirculating conveyor system 16, screening mechanism 18, discharge conveyor 20 and crusher 22. Frame 12 comprises an elongate rigid support structure or framework configured to support recirculating conveyor system 16, screening mechanism 18, discharge conveyor 20 and crusher 22. Frame 12 is preferably configured for being pulled by a vehicle (not shown) such that closed circuit crushing plant 10 is portable from site to site. Alternatively, frame 12 may be built as part of a chassis of a vehicle to allow for portability between sites. Wheels 14 are coupled to frame 12 and support frame 12.

Recirculating conveyor system 16 recirculates or reconveys crushed material M discharged from crusher 22 to material screening mechanism 18. Recirculating conveyor system 16 generally includes upper conveyor 24 and lower conveyor 26. Upper conveyor 24 generally extends from a first end 28 to a second end 30 of plant 10 so as to convey material from lower conveyor 26 at end 28 to a location generally above screening mechanism 18 at end 30. Upper conveyor 24 generally includes tail pulley 34, head pulley 36, endless belt 38 and troughing idlers 40. Pulley 34 is supported by frame 12 at end 30 of crushing plant 10 and freely rotates with belt 38. Pulley 36 is supported by frame 12 at opposite end 28 of crushing plant 10. Pulley 36 is adapted for being rotatably driven by drive mechanism 27. Pulleys 34 and 36 support opposite ends of belt 38 for movement between ends 28 and 30 of crushing plant 10.

Belt 38 comprises an elongate continuous, endless belt extending about pulleys 34 and 36 and is adapted to carry rocks, gravel, minerals or other particulate material from end 28 to end 30 of crushing plant 10. Belt 38 preferably comprises a generally flat, continuous band or belt made of a flexible material, such as reinforced rubber plies. Alternatively, belt 38 may additionally include transversely extending protuberance, ridges or paddles extending between the sides of belt 38 and adapted to engage and carry along the material being conveyed. Belt 38 preferably has a width of about 42 inches. As will be appreciated, the width of belt 38 depends upon the type and size of material being conveyed by belt 38. Furthermore, the length of belt 38 will also depend upon the length of crushing plant 10 and the distance separating screening mechanism 18 and crusher 22.

Troughing idlers 40 are supported by frame 12 at a plurality of spaced locations along the length of belt 38 between pulleys 34 and 36. Troughing idlers 40 are conventionally known and comprise rollers or wheels rotatably supported in engagement with belt 38 on opposite sides of belt 38 so as to elevate the sides of belt 38 above its central portion to provide belt 38 with a concave cross-sectional shape for containing material between the sides of belt 38.

Alternatively, conveyor system 16 may omit troughing idlers 40 or may alternatively include sidewalls supported by frame 12 or extending from the sides of belt 38 to assist in maintaining the material being conveyed upon belt 38.

As further shown by FIG. 1, upper conveyor 24 is preferably composed of two sections 42, 44, pivotally coupled or hinged to one another about hinge 46 such that section 42 may be pivoted from a raised position to a lowered position (shown in phantom) for storage or transportation.

Lower conveyor 26 extends from at least below crusher 22 to end 28 above upper conveyor 24. Lower conveyor 26 at least partially wraps about head pulley 36 of upper conveyor 24 so as to elevate and transfer crushed materials discharged from crusher 22 onto upper conveyor 24 for further conveyance to screening mechanism 18. Lower conveyor 26 generally includes tail pulley 50, intermediate pulley 52, head pulley 54, belt 56 and troughing idlers 58. Tail pulley 50 comprises a conventionally known pulley rotatably supported by frame 12 below crusher 22 and between crusher 22 and end 30 of crushing plant 10. Intermediate pulley 52 comprises a conventionally known pulley rotatably supported by frame 12 at end 28 beyond head pulley 36 of upper conveyor 24. Tail pulley 50 and intermediate pulley 52 freely rotate with the movement of belt 56.

Head pulley 54 comprises a conventionally known pulley rotatably supported by frame 12 between pulleys 50 and 52 and between pulleys 34 and 36 above belt 38. Head pulley 54 is adapted for being rotatably driven by drive mechanism 27 so as to drive belt 56 along and about pulleys 50, 52 and 54. Pulleys 50, 52 and 54 support belt 56 such that belt 56 extends from below crusher 22, around head pulley 36 of upper conveyor 24 and above belt 38 of upper conveyor 24.

Belt 56 comprises an elongate, continuous, endless belt extending about pulleys 50, 52 and 54 and is adapted to carry rocks, gravel, minerals and other particulate material from below crusher 22 to above belt 38 at end 28 of crushing plant 10. Belt 56 preferably comprises a generally flat, continuous band or belt made of a flexible material, such as reinforced rubber plies. Alternatively, belt 56 may additionally include transversely extending protuberances, ridges or paddles extending between the sides of belt 56 and adapted to engage and carry along the material being conveyed. Belt 56 is preferably six inches narrower than belt 38. Preferably, belt 56 has a width at least six inches less than the width of belt 38 to facilitate the elevation of material from belt 56 onto belt 38. In the exemplary embodiment, belt 56 has a width of about 36 inches. As will be appreciated, the exact width of belt 56 depends upon the type and size of material being conveyed by belt 56. Furthermore, the length of belt 56 will also depend upon the length of crushing plant 10 and the distance separating crusher 22 and end 28. Although not shown, conveyor system 16 preferably includes a conventionally known spring biased idler for taking up slack within belt 56.

Troughing idlers 58 are conventionally known and generally comprise rollers or wheels rotatably supported by frame 12 at spaced apart locations between pulleys 50 and 52. Troughing idlers 58 extend along opposite sides of belt 56 to elevate the opposite sides of belt 56 above its central portion. As a result, belt 56 has a generally concave cross-sectional configuration so as to maintain material on belt 56 as belt 56 is moved between pulleys 50 and 52.

Alternatively, conveyor system 16 may omit troughing idlers 58 or may alternatively include sidewalls supported by frame 12 or extending from the sides of belt 56 to assist in maintaining the material being conveyed upon belt 56.

Drive mechanism 27 is supported by frame 12 at end 28 and is operably coupled to head pulleys 36 and 54 of upper and lower conveyors 24 and 26, respectively. Drive mechanism 27 rotatably drives pulleys 36 and 54 so as to correspondingly rotatably drive belts 38 and 56, respectively. In lieu of utilizing a single drive mechanism 27 for driving both belts 38 and 56, conveyor system 16 may utilize individual drive mechanisms for each of belts 38 and 56.

Screening mechanism 18 comprises a conventionally known screening device supported by frame 12 and configured to screen and separate differently sized materials. An example for such a screening mechanism is disclosed in U.S. Pat. No. 4,383,651, the full disclosure of which is hereby incorporated by reference. Screening mechanism 18 receives material at end 30 from upper conveyor 24. Screening mechanism 18 preferably includes a plurality of vibrating screens (not shown). As the screens vibrate, material of a small enough diameter falls through openings in the screens and onto discharge conveyor 20 and is being discharged from plant 10 for commercial use or further processing. Material too large to pass through the plurality of vibrating screens flows, under the influence of gravity and the vibratory motion, towards end 28 and towards crusher 22 for further refinement by crusher 22.

Crusher 22 comprises a conventionally known crushing mechanism supported by frame 12 adjacent to screening mechanism 18 and above lower conveyor 26. Crusher 22 preferably comprises a conventionally known impact crusher. Alternatively, crusher 22 may comprise various other well-known crushing mechanisms for reducing the diameter of stone, gravel and mineral materials. Crusher 22 discharges materials onto lower conveyor 26 for further recirculation across screening mechanism 18 and crusher 22 by conveyor system 16.

In operation, rocks, gravel or other mineral materials are initially deposited onto upper conveyor 24 preferably utilizing a loading chute 62 from a primary or first stage crushing plant (not shown). As indicated by arrows 64, the material placed upon belt 38 is conveyed by belt 38 to end 30 at which point the material falls onto screening mechanism 18. Any material too large to pass through screening mechanism 18 is discharged into crusher 22 where it is further crushed. After crushing the material, crusher 22 discharges the material onto belt 56 of lower conveyor 26 adjacent pulley 50 as indicated by arrow 66. As indicated by arrow 68, lower conveyor 26 conveys and elevates the crushed material towards end 28. At end 28, pulleys 52 and 54 support belt 56 such that belt 56 wraps about head pulley 36 and about belts 38 of upper conveyor 24 so as to sandwich the material between belt 38 and 56. As a result, the material is elevated and lifted onto an upper surface of belt 38 for conveyance once again towards end 30.

Figure 2:
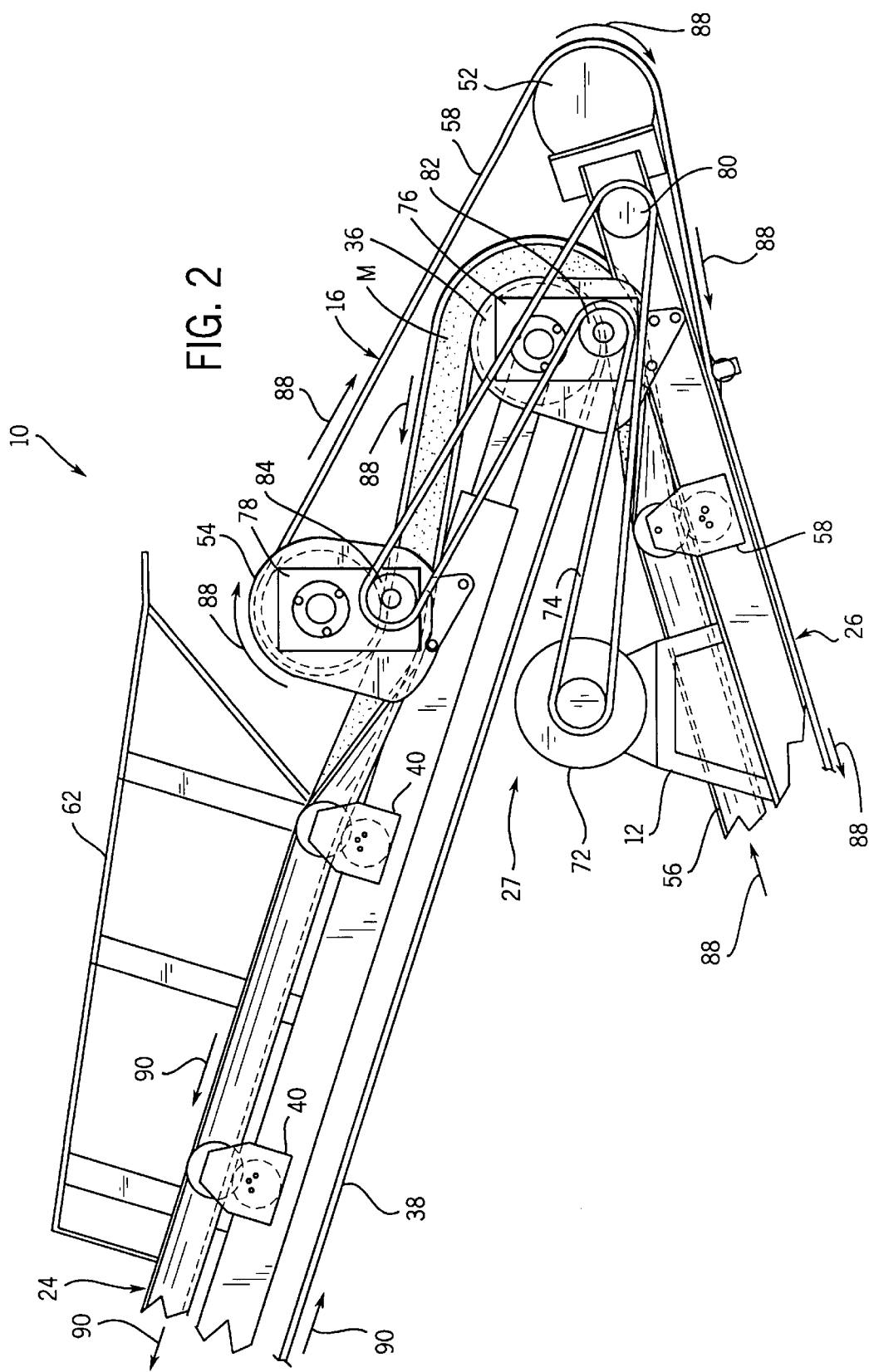
FIG. 2 is an enlarged fragmentary side elevational view of the crushing plant of FIG. 1 illustrating a portion of the conveyor system in greater detail.
Figure 3:
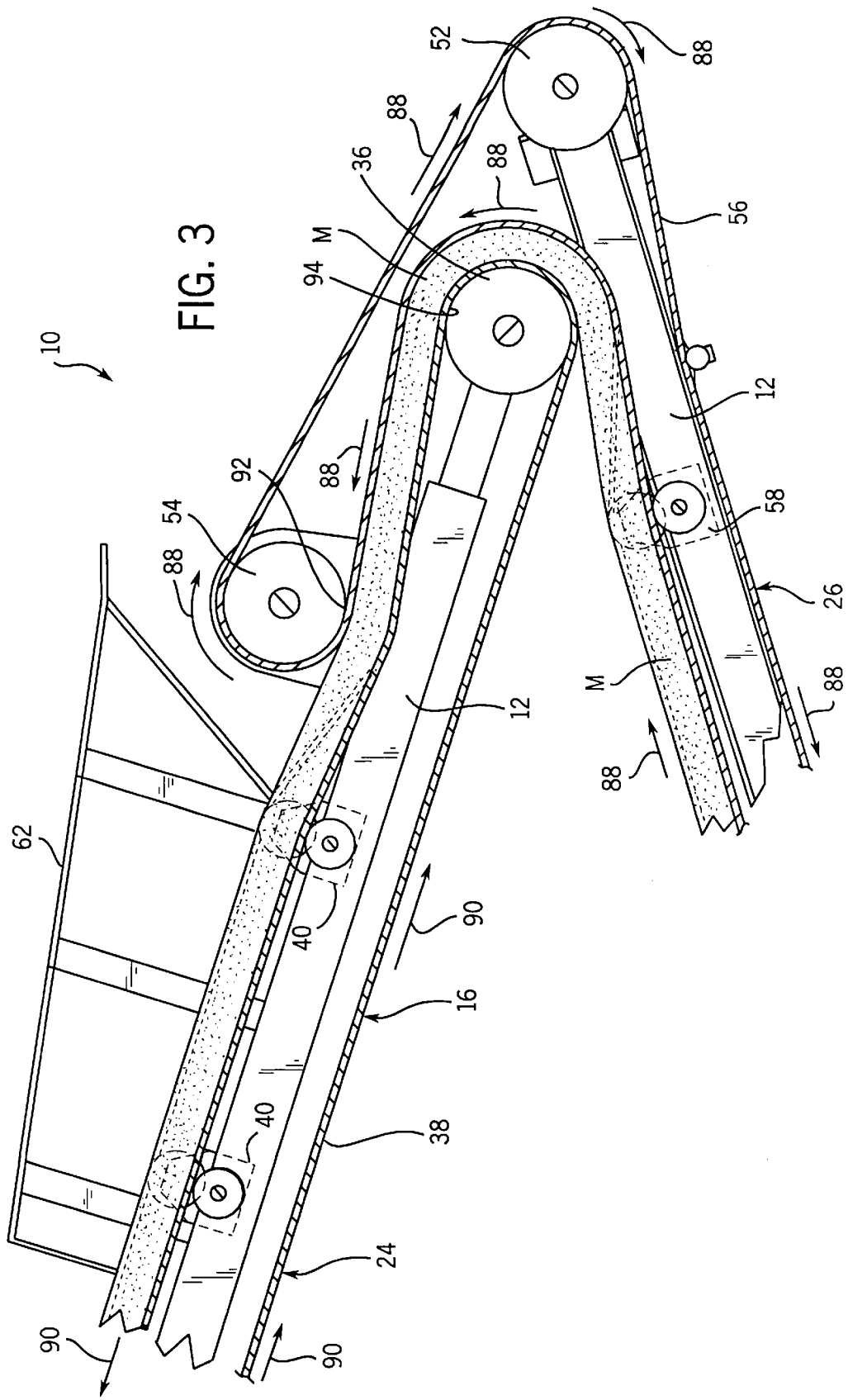
FIG. 3 is an enlarged fragmentary sectional view of the crushing plant of FIG. 2 illustrating the conveyor system elevating materials.

FIGS. 2 and 3 illustrate drive mechanism 27 and the elevation of material by conveyor system 16 in greater detail. Referring to FIG. 2, drive mechanism 27 generally includes motor 72, belt 74, speed reducing gear boxes 76, 78 and idler 80. Motor 72 comprises a conventionally known motor mounted to frame 12 and configured to rotatably drive belt 74. Motor 72 drives gear boxes 76 and 78 via belt 74 such that gear boxes 76 and 78 drive belts 38 and 56 in the directions indicated by arrows 88 and 90, respectively.

Belt 74 comprises a continuous, endless belt wrapped about input sheaves or pulleys 82 and 84 of gear box 76 and 78, respectively, and about idler 80 in a V-belt arrangement. Belt 74 transmits torque from motor 72 to gear boxes 76 and 78.

Gear box 76 comprises a conventionally known gear reduction or speed reduction unit supported by frame 12 and configured for converting and transmitting torque received from motor 72 via belt 74 to head pulley 36 so as to drive belt 38. Similarly, gear box 78 comprises a conventionally known gear or speed reduction unit supported by frame 12 and configured to transmit and convert torque received from motor 72 via belt 74 to head pulley 54 so as to rotatably drive belt 56. Gear boxes 76, 78 each preferably have substantially the same gear reduction ratio. As a result, because motor 72 drives both gear boxes 76, 78 which in turn drive belts 38 and 56, belts 38 and 56 are driven at similar speeds. Thus, belts 38 and 56 do not slip relative to one another and more effectively work in unison to elevate particulate material M from lower belt 56 about head pulley 36 and onto belt 38.

Although drive mechanism 27 is illustrated as utilizing a single motor 72 driving both belts 38 and 56 of upper conveyor 24 and lower conveyor 26, respectively, drive mechanism 27 may alternatively include multiple motors having matched rotational velocities or several motors configured to rotatably drive belts 38 and 56 at relatively the same speed. Although drive mechanism 27 is illustrated as rotatably driving head pulleys 36 and 54 to drive belts 38 and 56, respectively, drive mechanism 27 may alternatively be configured to drive one or more of pulleys 34, 50 or 52 in lieu of or in addition to pulleys 36 and 54.

As best shown by FIG. 3, belt 56 of lower conveyor 26 is driven in the direction indicated by arrows 88 about pulleys 36, 54 and 52 while belt 38 of upper conveyor 24 is also driven in the direction indicated by arrows 90 about pulley 36. In particular, lower conveyor 26 moves material M in a first direction towards pulley 36 while upper conveyor 24 moves material M in a second opposite direction away from pulley 36. As a result, upper conveyor 24 and lower conveyor 26 not only cooperate with one another to elevate material M but also cooperate with one another to reverse the flow direction of material M in a very compact arrangement occupying little space. This ability to reverse the flow direction of material M enables conveyor system 16 to recirculate material M from crusher 22 to screening mechanism 18 and back to crusher 22. Moreover, because upper conveyor 24 and lower conveyor 26 cooperate to reverse the flow direction of material M in an extremely small space, conveyor system 16 reduces the size and weight of crushing plant 10 while increasing the portability of crushing plant 10.

Because pulley 54 is rotatably supported horizontally between pulley 36 and pulley 54 (shown in FIG. 1) and because pulley 54 has a lower most circumferential belt engaging surface 92 substantially proximate to an upper most circumferential belt engaging surface 94 of pulley 36, pulley 54 supports and wraps belt 56 approximately 180 degrees about pulley 36 and about belt 38. As further shown by FIG. 3, belt 56 additionally overlaps belt 38 between pulley 36 and pulley 34 (shown in FIG. 1). As a result, belts 38 and 56 better sandwich particulate material M therebetween as belts 38 and 56 are driven about pulley 36.

Because both belts 38 and 56 are driven about the same pulley, pulley 36, belt 56 is automatically biased towards belt 38 to accommodate and adapt to different amounts of particulate material M being captured between belts 38 and 56. For example, as the amount of particulate material M being elevated between belts 38 and 56 reduces, belt 56 is pulled into closer proximity with belt 38. Conversely, as the amount of particulate material M being elevated between belts 38 and 56 is increased, the distance separating belts 38 and 56 adjacent pulley 36 also increases.

Because belt 56 of lower conveyor 26 at least partially wraps about pulley 36 of upper conveyor 24 against belt 38, belts 38 and 56 sandwich material therebetween to elevate the materials from lower conveyor 26 to upper conveyor 24 with fewer pulleys, with fewer overall pulleys that need to be driven and with fewer parts. Consequently, conveyor system 16 is simple, easily manufactured, compact, lightweight, low energy consuming, easily maintained and inexpensive. In addition, conveyor system 16 effectively elevates particulate material utilizing a drive mechanism having a single motor. Moreover, conveyor system 16 automatically accommodates varying volumes of particulate material M which must be elevated.

Although the present invention has been described with reference to preferred embodiments, workers skilled in the art will recognize that changes may be made in form and detail without departing from the spirit and scope of the invention. For example, although conveyor system 16 is illustrated for use with a portable closed circuit crushing plant, conveyor system 16 may also be utilized with a stationary crushing plant or with other machines or apparatus where particulate material must be elevated from a lower conveyor to an upper conveyor while reversing directions in relatively little space. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A conveyor system for conveying materials, the system comprising:
    an upper conveyor including:
        a first pulley configured to rotate about a first axis;
        a second pulley spaced from the first pulley and configured to rotate about a second axis; and
        a first endless belt extending about the first and second pulleys; and
    a lower conveyor including:
        a third pulley configured to rotate about a third axis below the first and second axes;
        a fourth pulley configured to rotate about a fourth axis above the first axis and between the first and second axes;
        fifth pulley configured to rotate about a fifth axis not between the first and second axes;
        a second endless belt supported about the third, fourth and fifth pulleys, wherein the third, fourth and fifth pulleys support the second endless belt such that the second endless belt at least partially wraps about the second pulley of the upper conveyor against the first endless belt to sandwich the materials therebetween and to elevate the materials from the lower conveyor to the upper conveyor; and
        means for maintaining the second endless belt in tension, whereby the second endless belt automatically adapts to varying amounts of the materials sandwiched between the first endless belt and the second endless belt.

2. The conveyor system of claim 1 wherein the first endless belt has a first width and wherein the second endless belt has a second width, wherein the first width is greater than the second width.

3. The conveyor system of claim 2 wherein the first width is at least six inches greater than the second width.

4. The conveyor system of claim 1 including at least one motor coupled to the first and second endless belts, wherein the first and second endless belts are driven at substantially similar speeds.

5. The conveyor system of claim 1 including a motor and a drive belt coupling the motor to the first and second endless belts, wherein the motor drives the first and second endless belts at substantially similar speeds.

6. The conveyor system of claim 1 wherein the second endless belt extends approximately 180 degrees about the second pulley.

7. The conveyor system of claim 1 wherein the first endless belt has a first portion extending about the second pulley and a second portion extending away from the second pulley, and wherein the second endless belt at least partially overlaps both the first and second portions.

8. The conveyor system of claim 1 wherein the first conveyor is adapted to move material in a first direction away from the second pulley, and when the second conveyor is adapted to move material in a second opposite direction towards the second pulley.

9. The conveyor system of claim 1 wherein portions of the first and second endless belts linearly extend parallel to one another.

10. The conveyor system of claim 1, wherein the first endless belt has a first width, wherein the second endless belt has a second width, and wherein the first width is greater than the second width.

11. A conveyor system for conveying materials, the system comprising:
    an upper conveyor including:
        a first pulley configured to rotate about a first axis;
        a second pulley spaced from the first pulley and configured to rotate about a second axis; and
        a first endless belt extending about the first and second pulleys; and
    a lower conveyor including:
        a third pulley configured to rotate about a third axis below the first and second axes;
        a fourth pulley configured to rotate about a fourth axis above the first axis and between the first and second axes;
        a fifth pulley configured to rotate about a fifth axis not between the first and second axes;
        a second endless belt supported about the third, fourth and fifth pulleys, wherein the third, fourth and fifth pulleys support the second endless belt such that the second endless belt at least partially wraps about the second pulley of the upper conveyor against the first endless belt to sandwich the materials therebetween and to elevate the materials from the lower conveyor to the upper conveyor.

12. The conveyor system of claim 11, wherein the first endless belt has a first width, wherein the second endless belt has a second width, and wherein the first width is greater than the second width.

13. The conveyor system of claim 11, wherein the first width is at least six inches greater than the second width.

14. The conveyor system of claim 11, including at least one motor coupled to the first and second endless belts, wherein the first and second endless belts are driven at substantially similar speeds.

15. The conveyor system of claim 11 including a motor and a drive belt coupling the motor to the first and second endless belts, wherein the motor drives the first and second endless belts at substantially similar speeds.

16. The conveyor system of claim 11, wherein the second endless belt extends approximately 180 degrees about the second pulley.

17. The conveyor system of claim 11, wherein the first endless belt has a first portion extending about the second pulley and a second portion extending away from the second pulley, and wherein the second endless belt at least partially overlaps both the first and second portions.

18. The conveyor system of claim 11, wherein the first conveyor is adapted to move material in a first direction away from the second pulley, and when the second conveyor is adapted to move material in a second opposite direction towards the second pulley.

19. The conveyor system of claim 11, wherein the second endless belt is maintained in tension, whereby the second endless belt automatically adapts to vary amounts of material sandwiched between the first endless belt and the second endless belt.

20. A conveyor system for conveying materials, the system comprising:

an upper conveyor including:
  a first pulley;
  a second pulley spaced from the first pulley; and
  a first endless belt extending about the first and second pulleys; and a lower conveyor including:
  a third pulley;
  a fourth pulley;
  a fifth pulley; and
  a second endless belt supported about the third, fourth and fifth pulleys, wherein the third, fourth and fifth pulleys support the second endless belt such that the second endless belt at least partially wraps about the second pulley of the upper conveyor against the first endless belt to sandwich the materials therebetween and to elevate the materials from the lower conveyor to the upper conveyor; and means for maintaining the second endless belt in tension, whereby the second endless belt automatically adapts to varying amounts of the sandwiched between the first endless belt and the second endless belt.

* * * * *